(12) United States Patent
Al-Harthi et al.

(10) Patent No.: US 9,701,819 B2
(45) Date of Patent: Jul. 11, 2017

(54) EFFECT OF MODIFIED GRAPHENE AND MICROWAVE IRRADIATION ON THE MECHANICAL AND THERMAL PROPERTIES OF P(S-CO-MMA)/GRAPHENE NANOCOMPOSITES

(71) Applicant: KING FAHD UNIVERSITY OF PETROLEUM AND MINERALS, Dhahran (SA)

(72) Inventors: Mamdouh Ahmed Al-Harthi, Dhahran (SA); Mukarram Zubair, Al-khobar (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/172,612

(22) Filed: Jun. 3, 2016

(65) Prior Publication Data

US 2016/0280889 A1    Sep. 29, 2016

Related U.S. Application Data

(62) Division of application No. 14/283,275, filed on May 21, 2014, now Pat. No. 9,382,392.

(51) Int. Cl.
*C08K 3/04* (2006.01)
*C08K 9/02* (2006.01)
*C08J 3/28* (2006.01)

(52) U.S. Cl.
CPC ....... *C08K 9/02* (2013.01); *C08J 3/28* (2013.01); *C08K 3/04* (2013.01); *C08J 2325/14* (2013.01)

(58) Field of Classification Search
CPC .......................................................... C08K 9/02
USPC .......................................................... 524/495
See application file for complete search history.

(56) References Cited

U.S. PATENT DOCUMENTS

| 8,557,916 B1 * | 10/2013 | Alsharaeh ............. C08F 292/00 524/495 |
| 2006/0241237 A1 | 10/2006 | Drzal et al. |
| 2011/0233452 A1 * | 9/2011 | Kim ....................... B82Y 25/00 252/62.54 |

* cited by examiner

*Primary Examiner* — Hui Chin
(74) *Attorney, Agent, or Firm* — Oblon, McClelland, Maier & Neustadt, L.L.P.

(57) ABSTRACT

A method for enhancing an interaction between graphene nanoparticles and a poly(styrene-co-methylmethacrylate), including modifying graphene with nitric acid to form graphene nanoparticles surface modified with one or more oxygen functionalities, melt blending the poly(styrene-co-methylmethacrylate) and the modified graphene nanoparticles to obtain a nanocomposite, and exposing the nanocomposite to microwave irradiation to form defects in the graphene nanoparticles. A blend composition, including graphene nanoparticles and a poly(styrene-co-methylmethacrylate), where the graphene nanoparticles are dispersed in the poly(styrene-co-methylmethacrylate), and the graphene nanoparticles are surface modified with oxygen functionalities.

11 Claims, 8 Drawing Sheets

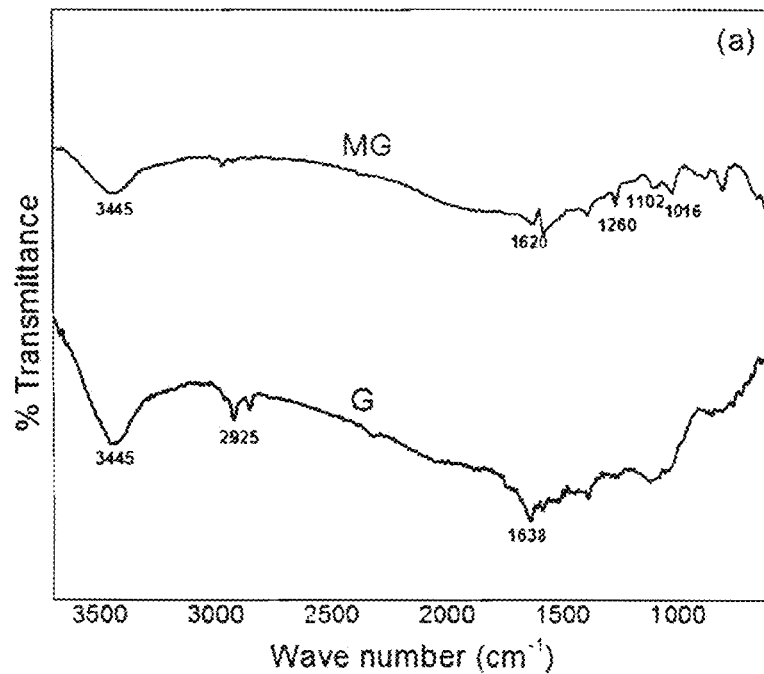
FIG. 3A
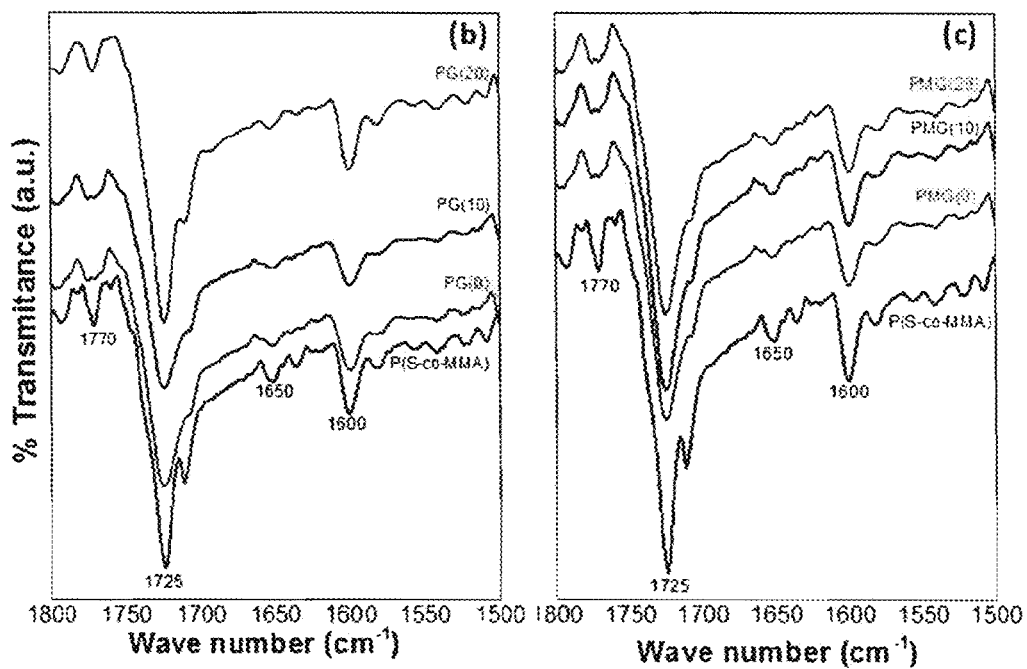
FIG. 3B                    FIG. 3C

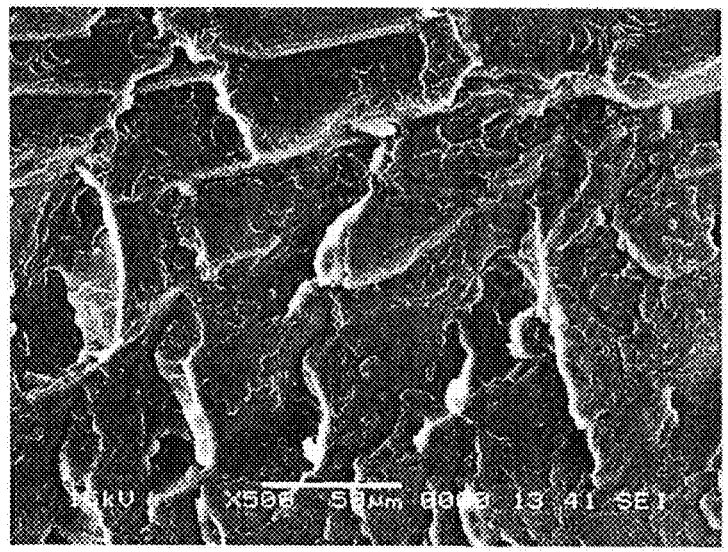
FIG. 8A
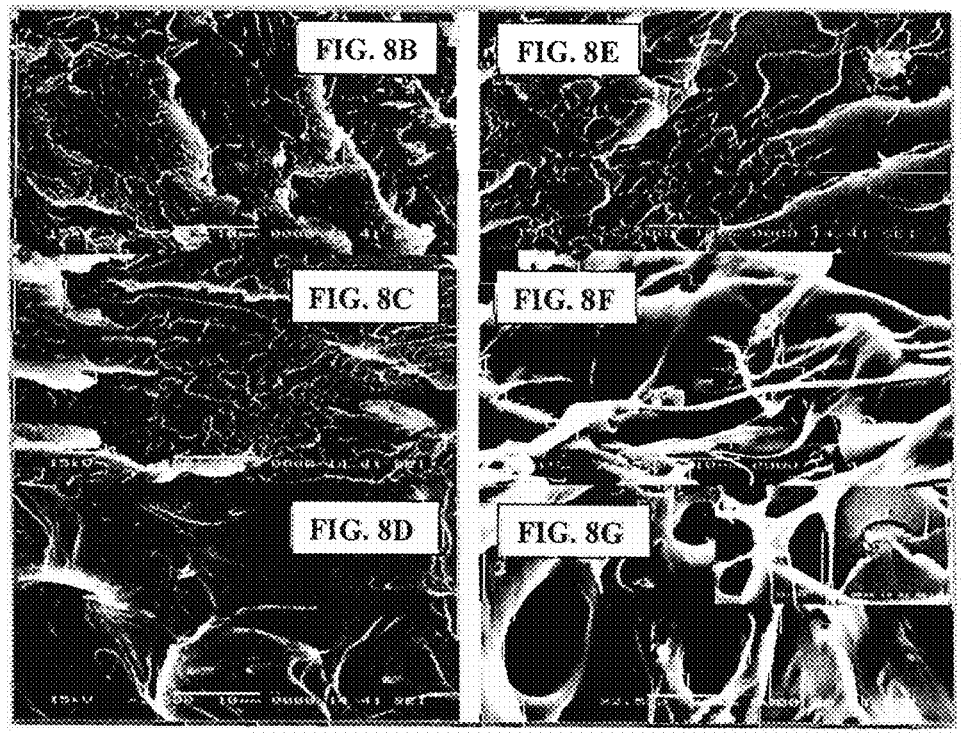

EFFECT OF MODIFIED GRAPHENE AND MICROWAVE IRRADIATION ON THE MECHANICAL AND THERMAL PROPERTIES OF P(S-CO-MMA)/GRAPHENE NANOCOMPOSITES

CROSS REFERENCE TO RELATED APPLICATIONS

This application is a Divisional of U.S. patent application Ser. No. 14/283,275 filed May 21, 2014.

BACKGROUND OF THE INVENTION

Field of the Disclosure

The present invention relates to a method for enhancing an interaction between graphene nanoparticles and a poly(styrene-co-methylmethacrylate) and to a blend composition obtained by the method.

Description of Related Art

Graphene, a single layer $sp^2$-hybridized carbon atom arranged in a two dimensional densely packed honeycomb crystal lattice, has opened a new outstanding and cost-effective corridor to formulate a broad variety of novel nanomaterials. See S. Park, S. R Rodney. Chemical methods for the production of graphenes. Nat Nanotechnol 2009; 4: 217, incorporated herein by reference in its entirety. The remarkable properties of graphene with low cost of source (graphite) have attracted interest in developing high performance and low cost polymer nanocomposites. See H. Kim, A. A Abdala, C. W Macosko. Graphene/polymer nanocomposites. Macromolecules 2010; 43:6515; K. Tapas, S. Bhadra, D. Yao, N. H Kim, S. Bose, J. H Lee. Recent Advances in Graphene Based Polymer Composites. Prog Polym Sci 2010; 35:1350; S. R Rodney, R. P Jeffrey, R. D Daniel, W. B Christopher. Graphene-Based *Polymer* Nanocomposites, Polymer 2011; 52:5-25, each incorporated herein by reference in their entirety. Chemical modification or functionalization of graphene such as oxidation of graphene by adding oxygen functionalities, such as hydroxyl, carboxylic acid and other organic groups, such as phenyl isocynate, prophyrin and epoxy groups has been recently investigated, to succeed full exploitation of graphene properties in the polymer nanocomposites. See C. Dongyu, S. Mo. Recent advance in functionalized graphene/polymer nanocomposites. J Mater Chem 2010; 20:7906-7915; S. R Rodney, S. Stankovich, D. P Richard, T. N Son. Synthesis and exfoliation of isocyanate-treated graphene oxide nanoplatelets. Carbon 2006; 44:3342-3347; X. Yanfei, L. Zhibo, Z. Xiaoliang, W. Yan, T. Jianguo, H. Yi, M. Yanfeng, Z. Xiaoyan, C. Yongsheng. A Graphene Hybrid Material Covalently Functionalized with Porphyrin: Synthesis and Optical Limiting Property. Adv Mater 2009; 21:1275-1279; A. B Bourlinos, D. Gournis, D. Petridis, T. Szabo, A. Szeri, I. Dekany. Graphite oxide: Chemical reduction to graphite and surface modification with primary aliphatic amines and amino acids. Langmuir 2003; 19:6050-6055, each incorporated herein by reference in their entirety). Functionalized graphene possess similar properties as graphene except a partly damaged carbon structure and the functionalities present on the surface may respond to the improvement of dispersion of graphene and interfacial interaction between graphene and a polymer matrix.

Irradiation technique has been employed for the modification of structural, electrical, mechanical, chemical and other desired properties of polymer nanocomposites. See Z. R Min, Q. Z Ming, X. Z Yong, M. Z Han, R. Walter, K. Friedrich. Structure-property relationships of irradiation grafted nano-inorganic particle filled polypropylene composites. Polymer 2001; 42:167-183; K. Satyendra, S. Paramjit, R. G Sonkawade, A. Kamlendra, K. Rajesh. 60 MeV Ni ion induced modifications in nano-CdS/polystyrene composite film. Radiation Physics and Chemistry 2013; unpublished; Q. Anjum, N. L Singh, A. K Rakshit, F Singh, V Ganesan. Ion beam modification and analysis of organometallics dispersed polymer film. Nuclear Instruments and Methods in Physics Research 2006; B244:235-238; W. Bibo, S. Lei, H. Ningning, T. Qilong, L. Hongdian, H. Yuan. Effect of electron beam irradiation on the mechanical and thermal properties of intumescent flame retarded ethylene-vinyl acetate copolymer/organically modified montmorillonite nanocomposites. Radiation Physics and Chemistry 2011; 80:1275-1281, each incorporated herein by reference in their entirety. The radiation mechanism accounts for the generation of free radicals on the polymer chains, and induced defects on graphene. See G. Olgun. An overview of current developments in applied radiation chemistry of polymers. Proceeding of technical meeting, IAEA. 2004; T. Desalegne, B. Alexander. Modification of graphene properties due to electron-beam irradiation. App PhysLett 2009; 94:013101; H. Ting, L. Jiangyou, Z. Minlin, J. Juan, Y. Xiaohui, L. Zhe, L. Lin. The effects of low power density $CO_2$ laser irradiation on graphene properties. Applied Surface Science 2013; 273:502-506; C. Giuseppe, G. Filippo, S. Sushant, R. Vito, R. Emanuele. Ion irradiation and defect formation in single layer graphene. Carbon 2009; 47:3201-3207, each incorporated herein by reference in their entirety. This responds to the major reactions like cross-linking, chain scission (degradation) and grafting in polymer nanocomposites, which may result in the improvement of the interfacial interaction between a polymer matrix and graphene. See F. R Jan. Photo degradation of Polymers (physical characteristics and application), Chapter 3, 60-66. Springer. 1996, incorporated herein by reference in its entirety.

BRIEF SUMMARY

An object of the invention is a method for enhancing an interaction between graphene nanoparticles and a poly(styrene-co-methylmethacrylate) (P(S-co-MMA)=poly(styrene-co-methylmethacrylate) herein for simplicity).

In an embodiment the method includes modifying graphene with nitric acid to form graphene nanoparticles surface modified with oxygen functionalities, melt blending the poly(styrene-co-methylmethacrylate) and the modified graphene nanoparticles to obtain a nanocomposite, and exposing the nanocomposite to microwave irradiation.

In another embodiment the nanocomposite is exposed to microwave irradiation for about ten minutes.

In another embodiment the method further includes compression molding the P(S-co-MMA)/graphene nanocomposites after the melt blending and before the irradiation.

In one embodiment of the invention, the nanocomposites are subjected to microwave irradiation at a frequency of from 2300 to 2600 MHz at a fixed power of from 900 to 1100 watts.

In another embodiment, the method includes irradiating in cycles of about 60 seconds, with 120 seconds of cooling in between cycles.

In one aspect of the invention, a blend composition includes graphene nanoparticles and a poly(styrene-co-methylmethacrylate), wherein the graphene nanoparticles are dispersed in the poly(styrene-co-methylmethacrylate) and the graphene nanoparticles are surface modified with oxygen functionalities.

In one embodiment, the irradiated P(S-co-MMA)/modified graphene nanocomposites have an intensity level of the D band at 1357 cm$^{-1}$ ranging from 2000 to 2200 and an intensity of the G band at 1583 cm$^{-1}$ of from 2050 to 2200.

In another embodiment, the irradiated P(S-co-MMA)/modified graphene nanocomposites have a crystal lattice structure with layer to layer spacing of modified graphene in the range of from 0.35 to 0.55 nm.

In another embodiment, the storage modulus of the irradiated P(S-co-MMA)/modified graphene nanocomposites ranges from 1800 to 2200 MPA at 100° C. and from 1400 to 1800 MPA at 40° C.

In another embodiment of the invention, the increase in glass transition temperature of the irradiated P(S-co-MMA)/modified graphene nanocomposites ranges from 2.0 to 6.0° C.

BRIEF DESCRIPTION OF THE DRAWINGS

FIG. 3A is a graph showing FTIR spectra of pristine graphene (G=pristine graphene) and modified graphene (MG=modified graphene).

FIG. 3B is a graph showing FTIR spectra of control P(S-co-MMA) and non-irradiated and irradiated poly(styrene-co-methylmethacrylate)/graphene (PG=P(S-co-MMA)/graphene).

FIG. 3C is a graph showing FTIR spectra of control P(S-co-MMA) and non-irradiated and irradiated poly(styrene-co-methylmethacrylate)/modified graphene (PMG=P(S-co-MMA)/modified graphene).

FIG. 8A is an SEM image of control P(S-co-MMA).

FIG. 8B is an SEM image of a non-irradiated sample of PG.

FIG. 8C is an SEM image of a 10 minute irradiated sample of PG.

FIG. 8D is an SEM image of a 20 minute irradiated sample of PG.

FIG. 8E is an SEM image of a non-irradiated sample of PMG.

FIG. 8F is an SEM image of a 10 minute irradiated sample of PMG.

FIG. 8G is an SEM image of a 20 minute irradiated sample of PMG.

DETAILED DESCRIPTION

Figure 1:
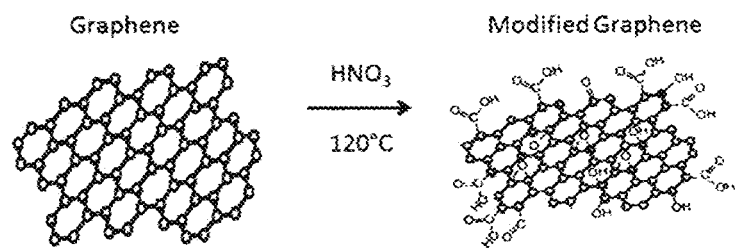
FIG. 1 is a schematic representation of chemical oxidation of graphene using nitric acid.

The present disclosure includes a method to enhance an interaction between graphene nanoparticles and a poly(styrene-co-methylmethacrylate) (P(S-co-MMA)=poly(styrene-co-methylmethacrylate)), which is employed as a host material. P(S-co-MMA) is used in various fields such as microelectronics, protective coatings, bio materials and solar technology, etc. See F. T Larry, C. G Willson, T. Seiichi. Polymers for Microelectronics (resist and dielectrics). American Chemical Society. 1993; A. G Peter, C. D Bogdan, J. C Justin. Self-assembling polystyrene-block-poly(ethylene oxide) copolymer surface coatings: Resistance to protein and cell adhesion. Biomaterials 2009; 30:2449-2456; K. Yoshihiko, Y. Hirofumi, A. Kunio. Preparation, Photocatalytic Activities and Dye-Sensitized Solar-Cell Performance of Submicron-Scale TiO$_2$ Hollow Spheres. *Langmuir* 2008; 24(2):547-550, each incorporated herein by reference in their entirety. In the present method, P(S-co-MMA)/graphene nanocomposites were prepared via melt blending. The blends of styrene-methyl methyl acrylate co-polymer with pristine and modified graphene were irradiated using a microwave radiation technique for different time periods. The changes in the mechanical and thermal properties of the P(S-co-MMA)/graphene nanocomposites were examined using two modes: modification of graphene and microwave irradiation. The effect of microwave irradiation on the chemical structure, interaction of pristine and modified graphene on polymer matrix and surface morphology of the nanocomposites were analyzed.

P—(S-co-MMA) is synthesized by free radical polymerization of styrene and methyl methacrylate in the presence of an initiator, such as benzoyl peroxide. The polymerization reaction is performed under a nitrogen environment at a temperature of from 90 to 130° C., preferably from 100 to 120° C., and especially preferably about 110° C. for a time period of from 4 to 8 hours, preferably from 5 to 6 hours. After the polymerization reaction, at least one solvent, such as THF, is added to the mixture and dissolved for a time period ranging from 1 to 5 days, preferably from 2 to 4 days. Then, the dissolved polymer solution is precipitated with an excess amount of a second solvent, such as methanol, and then dried in an oven at a temperature of from 30 to 60° C., preferably from 40 to 50° C., for a time period of from 20 to 30 hours, preferably from 23 to 27 hours, especially preferably from 24 to 26 hours.

Preferably, a content ratio (weight/weight) of polystyrene to methyl methacrylate in the P(S-co-MMA) copolymer is from 50-90/20-40, preferably from 60-80/25-35, and especially preferably about 70/30.

Graphene is subjected to chemical modification by a thermal oxidation method. The method includes adding concentrated nitric acid to graphene to obtain a mixture, and refluxing the mixture at a temperature ranging from 100 to 140° C., preferably from 110 to 130° C., especially preferably about 120° C. for a time period of from 30 to 60 hours, preferably from 40 to 55 hours, especially preferably from 45 to 50 hours. A weight/volume ratio of graphene to nitric acid is from 1-3 g graphene/100-500 ml nitric acid, preferably from 1.5-2.5 g graphene/200-400 ml nitric acid, especially preferably from 1.25-2.25 g graphene/250-350 ml nitric acid, and particularly preferably about 2 g graphene/

300 ml nitric acid. A concentration of nitric acid is from 50 to 100%, preferably 60 to 90%, especially preferably 70 to 80%.

After the reflux reaction, the reaction mixture is diluted with from 300 to 700 ml deionized water, preferably from 400 to 600 ml, especially preferably from 450 to 550 ml, and then vacuum-filtered. The filter paper used for the vacuum filtration has a porosity of from 2 to 5 µm, preferably from 3 to 4 µm. Then, the graphene is repeatedly washed with deionized water until a pH of from 6.5 to 8.5, preferably from 6.7 to 7.3, especially preferably from 6.9 to 7.1, and particularly preferably about 7, is obtained. The resulting product is then dried in a vacuum oven at a temperature of from 80 to 120° C., preferably from 90 to 110° C., especially preferably about 100° C.

The chemical modification of graphene yields formation of oxygen based functionalities on the defect sites and side walls of graphene. Oxygen functionalities, as used herein, refer to carboxylic, carbonyl and hydroxyl groups on the defects sites and side walls of graphene.

After the modification of graphene, the modified graphene nanoparticles are melt blended with P(S-co-MMA). Melt blending as used herein involves mixing modified graphene with P(S-co-MMA) copolymer and pristine and mixing at a temperature of from 160 to 200° C., preferably from 170 to 190° C., especially preferably about 180° C. Modified graphene is added in an amount of from 0.05 to 0.125 wt %, preferably from 0.08 to 0.115 wt %, especially preferably from 0.09 to 0.11 wt %, and particularly preferably about 0.1 wt %, based on 100 wt % of P(S-co-MMA). The melt blending is performed at a speed of from 50 to 70 rpm, preferably from 55 to 65 rpm, and especially preferably about 60 rpm, for a time period of from 5 to 20 min, preferably from 10 to 15 min. Melt blending leads to exfoliation in the P(S-co-MMA) polymer matrix. The P(S-co-MMA) polymer matrix is not 100% exfoliated.

The P(S-co-MMA)/modified graphene nanocomposites are further prepared into thin sheets by compression molding at a temperature of from 120 to 160° C., preferably from 130 to 150° C., especially preferably about 140° C. under a pressure of from 80 to 110 MPa, preferably from 90 to 110 MPa, especially preferably from 95 to 105 MPa for a time period of from 5 to 15 min, preferably from 7 to 10 min. Then, the thin sheets are cooled to room temperature. A thickness of the thin sheets ranges from 0.8 to 1.2 mm, preferably from 0.9 to 1.1 mm, and especially preferably about 1.0 mm.

After preparation of the P(S-co-MMA)/modified graphene nanocomposites, the nanocomposites are exposed to microwave irradiation at a frequency of from 2300 to 2600 MHz, preferably from 2400 to 2500 MHz, especially preferably about 2450 MHz at a fixed power of from 900 to 1100 watts, preferably from 950 to 1050 watts, especially preferably about 1000 watts, in the presence of air. Microwave irradiation of P(S-co-MMA)/modified graphene nanocomposites result in the formation of free radicals on polymer chains and defects in graphene crystal structure. The polymer chains bond to the graphene in a covalent form. Preferably, bonding is through the methacrylate portion of the copolymer to the graphene, e.g., addition across a C=C bond. This leads to an improvement in interaction of graphene with P(S-co-MMA) polymer matrix and enhanced final property of the nanocomposites.

The irradiation is performed at a treatment time ranging from 2 to 19 minutes, preferably from 5 to 15 minutes, especially preferably from 8 to 12 minutes, and particularly preferably about 10 minutes. This irradiation treatment time range provides at least 80% exfoliated graphene, preferably at least 90% exfoliated, especially preferably at least 95% exfoliated, and particularly preferably completely exfoliated graphene, in the P(S-co-MMA) polymer matrix, which obtains strong interfacial interaction of graphene in the P(S-co-MMA) matrix. The graphene peak intensity decreases by at least 80%, preferably at least 90%, especially preferably at least 95% after irradiation, compared to the non-irradiated material.

Preferably, the nanocomposites are irradiated in cycles. The cycles range from 40 to 80 seconds, preferably from 50 to 70 seconds, especially preferably about 60 seconds. After each cycle of irradiation, the nanocomposites are cooled to room temperature for a time period ranging from 100 to 140 seconds, preferably from 110 to 130 seconds, especially preferably about 120 seconds. The cooling time avoids the effect of heat on the P(S-co-MMA)/modified graphene nanocomposites.

The intensity level of the C=O absorption band at 1725 $cm^{-1}$ of the non-irradiated and irradiated P(S-co-MMA)/graphene nanocomposites and P(S-co-MMA)/modified graphene nanocomposites decreases by at least 80%, preferably at least 90%, especially preferably at least 95%, compared to P(S-co-MMA). This results from the reaction of epoxy groups of P(S-co-MMA) with the graphene surface after melt blending and irradiation. The intensity of the carbonyl group at peak 1725 $cm^{-1}$ increases as the P(S-co-MMA)/modified graphene nanocomposites are irradiated for the preferred time range, particularly up to 10 min. This behavior indicates the carbonyl bonding between the oxygen functionalities on the structure of modified graphene and the carbonyl group on P(S-co-MMA) chains. The intensity of the aromatic group peak at 1600 $cm^{-1}$ of the non-irradiated and irradiated P(S-co-MMA)/graphene nanocomposites and P(S-co-MMA)/modified graphene nanocomposites decreases by at least 80/o, preferably at least 90%, especially preferably at least 95%, compared to P(S-co-MMA). This results from the grafting of styrene chains on the graphene and the modified graphene surface.

At longer duration of microwave irradiation of more than 19 min, particularly more than 15 min, and especially more than 12 min, an increase in the intensity of the C=O group at peak 1725 $cm^{-1}$ of P(S-co-MMA)/modified graphene nanocomposites attributes to the photo degradation mechanism of the P(S-co-MMA)/modified graphene nanocomposite. Irradiation for the longer time range results in the reduction of intensity of the C=O group, which is associated with chain scission and breakage of the carbonyl bond of modified graphene with P(S-co-MMA). Such degradation of nanocomposites causes reduction in storage modulus and glass transition temperatures.

The intensity level of the D band ($I_D$) at 1357 $cm^{-1}$ of graphene ranges from 85 to 100. The intensity level of the D band ($I_D$) at 1357 $cm^{-1}$ of modified graphene ranges from 900 to 1000, preferably from 925 to 975, especially preferably from 935 to 950. The intensity level of the D band ($I_D$) at 1357 $cm^{-1}$ of P(S-co-MMA)/graphene ranges from 100 to 200, preferably from 125 to 175, especially preferably from 150 to 165. The intensity level of the D band ($I_D$) at 1357 $cm^{-1}$ of (S-co-MMA)/modified graphene ranges from 600 to 750, preferably from 625 to 725, especially preferably from 650 to 700. The intensity level of the D band ($I_D$) at 1357 $cm^{-1}$ of irradiated P(S-co-MMA)/graphene ranges from 1300 to 1500, preferably from 1350 to 1450, especially preferably from 1400 to 1425. The intensity level of the D band ($I_D$) at 1357 $cm^{-1}$ of irradiated P(S-co-MMA)/modified graphene ranges from 2000 to 2200, preferably from 2050 to 2150, especially preferably from 2075 to 2000.

The intensity level of the G band ($I_G$) at 1583 cm$^{-1}$ of graphene ranges from 850 to 900. The intensity level of G band ($I_G$) at 1583 cm$^{-1}$ of modified graphene ranges from 1100 to 1250, preferably from 1125 to 1225, especially preferably from 1150 to 1200. The intensity level of the G band ($I_G$) at 1583 cm$^{-1}$ of P(S-co-MMA)/graphene ranges from 250 to 350, preferably from 275 to 325, especially preferably from 290 to 310. The intensity level of the G band ($I_G$) at 1583 cm$^{-1}$ of (S-co-MMA)/modified graphene ranges from 700 to 900, preferably from 750 to 850, especially preferably from 775 to 825. The intensity level of the G band ($I_G$) at 1583 cm$^{-1}$ of irradiated P(S-co-MMA)/graphene ranges from 1400 to 1600, preferably from 1450 to 1550, especially preferably from 1480 to 1515. The intensity level of the G band ($I_G$) at 1583 cm$^{-1}$ of irradiated P(S-co-MMA)/modified graphene ranges from 2050 to 2200, preferably from 2100 to 2175, especially preferably from 2125 to 2150.

The $I_D/I_G$ ratio demonstrates the level of defects. The $I_D/I_G$ ratio is higher in value for non-irradiated PMG compared to non-irradiated PG nanocomposites, due to better interaction and high grafting of P(S-co-MMA) chain on the surface of modified graphene compared to pristine graphene. The $I_D/I_G$ ratio of PG and PMG nanocomposites increases after irradiation, due to formation of disorder in pristine and modified graphene, where the crystalline structure of graphene transforms to nanocrystalline graphene. The structural modification leads to the improvement in interaction and covalent bond formation between P(S-co-MMA) chains with pristine and modified graphene.

At longer duration of microwave irradiation of more than 19 min, particularly more than 15 min, and especially more than 12 min, a further increase in the intensity of the D-peak and G-peak attributes to more defects formed on pristine and modified graphene. Irradiation for the longer time range results in transformation from a nanocrystalline structure to an amorphous phase, which weakens the interfacial interaction with P(S-co-MMA) chains and thus, reduction in mechanical and thermal properties of the nanocomposites.

The present disclosure also includes a blend composition, comprising graphene nanoparticles and a poly(styrene-co-methylmethacrylate), wherein the graphene nanoparticles are dispersed in the poly(styrene-co-methylmethacrylate), and wherein the graphene nanoparticles are surface modified with oxygen functionalities. The modified graphene contains oxygen atoms bonded to the graphene structure, e.g., by treatment with nitric acid, prior to mixing with the poly(styrene-co-methylmethacrylate). The oxygen atoms may be present as hydroxyl groups, carbonyl groups or epoxy.

Modified graphene has a diffraction peak of 18.9±0.5°, preferably 18.9±0.2° C. After melt blending, the modified graphene has a diffraction peak which is reduced by 1 to 10%, preferably from 3 to 8%, especially preferably from 4 to 7%. After irradiation, the irradiated modified graphene has a diffraction peak which is further reduced by 1 to 10%, preferably from 3 to 8%, especially preferably from 4 to 7% compared to the melt blended graphene before irradiation.

The nanocomposites obtained by the method has a crystal lattice structure with layer to layer spacing of modified graphene in the range of from 0.35 to 0.55 nm, preferably from 0.40 to 0.50, especially preferably from 0.45 to 0.48. The layer to layer spacing of modified graphene is higher than pristine graphene. The presence of oxygen functionalities on the surface of modified graphene enhances the interaction with microwave irradiation and obtains superior interaction of modified graphene in the P(S-co-MMA) matrix.

The storage modulus of the irradiated P(S-co-MMA)/modified graphene nanocomposites ranges from 1800 to 2200, preferably from 1850 to 2150, and especially preferably from 1900 to 2100 MPa at 100° C. and from 1400 to 1800, preferably from 1500 to 1750, especially preferably from 1600 to 1700 MPa at 40° C. The storage modulus shows significant improvement which is achieved from exposure to microwave radiation. The increase in storage modulus is from 25 to 33%. The enhancement in storage modulus attributes to the influence of intrinsic mechanical property of modified graphene, improvement in interaction of modified graphene in P(S-co-MMA) matrix due to structural changes by microwave irradiation, and formation of covalent bonds between modified graphene with P(S-co-MMA) chains. The presence of polar groups on the surface of modified graphene improves the interaction of modified graphene after microwave radiation, obtaining stronger and higher storage modulus compared to unmodified graphene polymer nanocomposite.

The glass transition temperature of the non-irradiated P(S-co-MMA)/modified graphene nanocomposites ranges from 90 to 100° C., preferably from 92 to 98° C., especially preferably from 93 to 96° C. The glass transition temperature of irradiated P(S-co-MMA)/modified graphene nanocomposite increases in a range of from 2 to 6.0° C., preferably from 3 to 5.5° C., and especially preferably from 4 to 5.0° C., from the glass transition temperature of the non-irradiated P(S-co-MMA)/modified graphene nanocomposite. Thus, the glass transition temperature of irradiated P(S-co-MMA)/modified graphene nanocomposite ranges from 92 to 106° C., preferably from 97 to 105° C., especially preferably from more than 100 to 103° C.

EXAMPLES

Raw Materials

Styrene (99%), methyl methacrylate (MMA, 99%) and benzoyl peroxide were all purchased from Sigma-Aldrich and were used as received. Tetrahydroforan (THF), methanol and nitric acid (97%) were obtained from Pure Chemika. Graphene (96-99%, 50-100 nm) was purchased from Grafen Chemical Industries Co (Turkey).

Polymerization of Poly(Styrene-Co-Methyl Methacrylate)

Poly(styrene-co-methyl methacrylate) is synthesized by free radical polymerization. Benzoyl peroxide was used as initiator, 0.1 wt % of total volume of monomers. Reaction took place in a round bottom flask equipped with a magnetic stirrer at 110° C. for 5 hours under a nitrogen environment. After reaction, THF (60 ml per 10 ml of monomer) was added into the round bottom flask and kept with stirring for 2-4 days to dissolve the product. The dissolved polymer solution was then precipitated in excess amount of methanol and then dried in oven at 40° C. for at least 24 hrs.

Modification of Graphene

Chemical modification of graphene was carried out through a thermal oxidation method. See B. Kannan, B. Marko. Chemically Functionalized Carbon Nanotubes, Small 2005; 1:180-192, incorporated herein by reference in its entirety. First 300 ml of concentrated nitric acid (69%, AnalaR grade) was added to 2 g of graphene (as-received) in a 1000 ml round bottom flask. The mixture was refluxed at 120° C. for 48 hours to produce maximum oxidation and then cooled to room temperature. The reaction mixture was diluted with 500 ml of deionized water and vacuum-filtered using 3 μm porosity filter paper. The washing operation using deionized water was repeated until the pH became similar to deionized water. The final product was then dried in a vacuum oven at 100° C. Chemical modification of graphene led to the formation of oxygen based functionalities (carboxylic, carbonyl and hydroxyl groups) on the defects sites and sides walls of graphene (FIG. 1).

Preparation of Nanocomposites

P(S-co-MMA)/graphene (PG) and P(S-co-MMA)/modified graphene (PMG) nanocomposites were prepared using a MiniLab Torque Rheometer. 0.1 wt % of pristine and modified graphene was added to 6 g of P(S—CO-MMA) copolymer and mixed for 10 minutes at a temperature of 180° C. at a speed of 60 rpm. Thin sheets of the nanocomposites with approximate thickness of 1 mm were prepared by compression molding for 8 minutes at a temperature of 140° C. under 97 MPa pressure and cooled to room temperature. Table 1 illustrates the composition of different samples produced in this study.

TABLE 1

Composition of P(S-co-MMA) and its composites

| Sample Name | Copolymer Composition P(S-co-MMA)* | P(S-co-MMA) content (g) | Graphene/Modified Graphene content (mg) | Irradiation time (minutes) |
|---|---|---|---|---|
| P(S-co-MMA) | 70.6/29.4 | 6 | 0/0 | 0 |
| PG(0) | 70.6/29.4 | 6 | 6/0 | 0 |
| PMG(0) | 70.6/29.4 | 6 | 0/6 | 0 |
| PG(5) | 70.6/29.4 | 6 | 6/0 | 5 |
| PMG(5) | 70.6/29.4 | 6 | 0/6 | 5 |
| PG(10) | 70.6/29.4 | 6 | 6/0 | 10 |
| PMG(10) | 70.6/29.4 | 6 | 0/6 | 10 |
| PG(20) | 70.6/29.4 | 6 | 6/0 | 20 |
| PMG(20) | 70.6/29.4 | 6 | 0/6 | 20 |

*Copolymer composition is calculated using Proton-NMR.

Microwave Irradiation Method

Microwave irradiation of PG and PMG nanocomposites were carried out at frequency of 2,450 MHz at fixed power of 1000 watt with different treatment time. The irradiation was carried out using domestic microwave oven with internal turnable table. Samples of dimension (4×10×1 mm) were treated at different treatment times at constant power of 1000 watt in the presence of air. Irradiation was performed at cycles of 60 seconds in the presence of air. After each cycle, the sample was then cooled to room temperature for 120 seconds, to avoid the effect of heat on the polymer graphene composite sample. Total irradiation treatment times were 5, 10 and 20 minutes.

Characterization

Spectroscopic Analysis

The FTIR spectra were recorded using Nicolet 6700 spectrometer with resolution of 4 cm$^{-1}$. In order to analyze the functional groups like carbonyl and hydroxyl group before and after irradiation of samples, the band range 1500-1725 cm$^{-1}$ was used. For Raman Spectroscopy, Raman Aramis (Horiba JobinYvon) instrument with Laser power of 0.7 mW and resolution of 473 nm was used. The composition of styrene and methyl meth acrylate in the copolymer was calculated by using Proton-NMR spectra estimated at room temperature using Bruker 500 MHz spectrometer.

Dynamic Mechanical Analysis (DMA)

The dynamic mechanical properties of the samples before and after irradiation is investigated in a temperature range of 40° C. to 160° C. in the tension mode at a heating rate of 5° C./min and a frequency of 1 Hz using Perkin Elmer DMA Q-800. The dynamic mechanical properties are tested under nitrogen environment at a load of 5N with the average sample size 4×10×1 mm.

Differential Scanning Calorimetry (DSC)

The glass transition temperature of the samples was determined by using DSC-Q 1000, TA instrument. Samples were weighed with +0.5 mg accuracy and experiments were carried out under nitrogen environment. The first stage of heating was carried out to remove the thermal history of the sample if any. The cooling step was done at a rate of 5° C./minute and the final heating at a rate of 10° C./minute was carried out to determine the T, of the sample.

X-Ray Diffraction (XRD)

XRD studies were carried out using D8 Advance X-Ray Instrument with wavelength of λ=1.542 A° and 2θ range from 2°-70°.

Scanning Electron Microscopy (SEM)

Scanning electron micrographs (SEM) were taken by using JSM-6460 LV (Jeol) SEM. Prior to the experiment, the samples were cryo-fractured using liquid nitrogen and the cross section was sputter coated with gold for 2 minutes to make the surface conductive.

Figure 2:
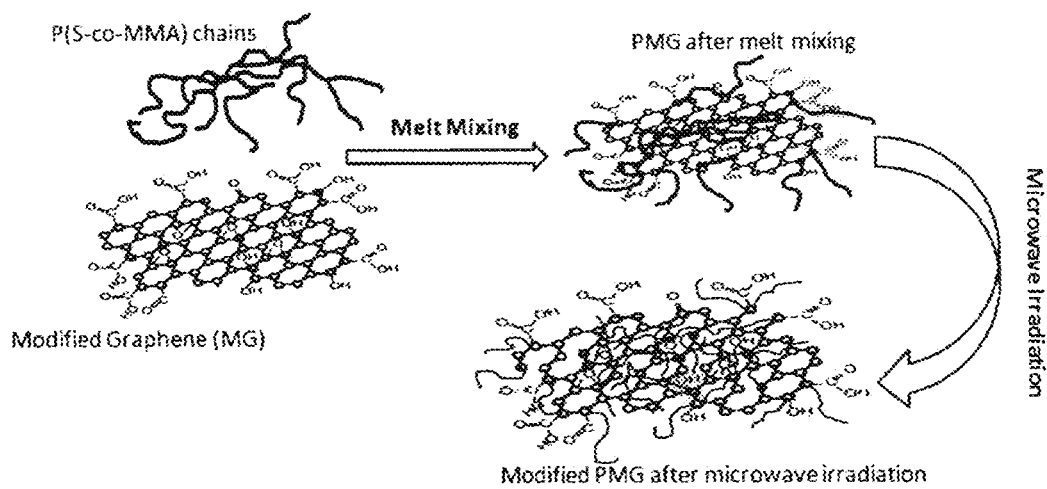
FIG. 2 is schematic representation of improvement of interaction between graphene and polymer matrices through chemical oxidation and microwave irradiation.

The presence of oxygen groups on the surface of modified graphene not only improved the interfacial interaction with polymer matrix during melt blending but also developed greater influence of microwave irradiation. Therefore, before and after microwave exposure, the P(S-co-MMA)/modified graphene (PMG) compared to P(S-co-MMA)/graphene (PG) nanocomposites, resulted in better improvement of the interfacial interaction between modified graphene and polymer matrices as demonstrated in FIG. 2. This assisted to develop cross-linked network and resulted in enhanced mechanical and thermal properties of PMG nanocomposites.

FTIR Analysis

The structural changes in pristine graphene (G) after chemical oxidation and nanocomposites before and after irradiation were examined using FTIR spectroscopy. In FIG. 3A for MG spectra, the characteristics vibrations include C—O stretching peak at 1016 and 1102 cm$^{-1}$, the C—O—C peak at 1260, C=C stretching peak at 1620 cm$^{-1}$ and C—OH peak at 3443 cm$^{-1}$. See R. M. Silverstein, G. C Bassler, T. C Morrill. Spectrometric Identification of Organic Compounds. 4th Edition. New York: John Wiley and Sons, 1981, incorporated herein by reference in its entirety. The intensity of hydroxyl group in MG is lower than G (FIG. 3A) which may be due to the reaction of hydroxyl group during chemical oxidation.

In FIGS. 3A and 3B, the spectrum of non-irradiated and irradiated PG and PMG nanocomposites retained the similar trend except there was some change in the intensity of the absorption band of carbonyl groups (C=O) at peak 1725 and 1770 cm$^{-1}$ and aromatic group of styrene (C=C) at peak 1600 cm$^{-1}$.

For non-irradiated and 10 minutes irradiated PG nanocomposites, the C=O absorption band at peak 1725 cm$^{-1}$ decreased to lower intensity as compared to P(S-co-MMA). This attributes to the reaction of epoxy groups of P(S-co-MMA) with the graphene surface after melt blending and 10 minutes irradiation.

In FIG. 3C, the increasing behavior in the intensity of the carbonyl group at peak 1725 cm$^{-1}$ of PMG nanocomposites up to 10 minutes irradiation indicates the carbonyl bonding between the oxygen functionalities on the structure of MG and the carbonyl group on the P(S-co-MMA) chains. See H. D Huang, P. G Ren, J. C Chen, W. Q Zhanga, X. Ji, Z. M Li. High barrier graphene oxide nanosheet/poly(vinyl alcohol) nanocomposite films. Journal of Membrane Science 2012; 409-410:156-163, incorporated herein by reference in its entirety. The nature of the carbonyl-carbonyl bonding is represented by C—O—O—C. In addition, the peak at 1600 cm$^{-1}$ that corresponds to the aromatic vibration of P(S-co-MMA) shifted to lower intensity level in non-irradiated and 10 minutes irradiated PG and PMG nanocomposites. This may be due to the grafting of styrene chains on the graphene and MG surface.

At longer duration of microwave irradiation (20 minutes), an increase in the intensity of C=O group at peak 1725 cm$^{-1}$ of PG nanocomposites attributes the photo degradation mechanism of PG nanocomposite. For 20 minutes irradiated PMG nanocomposite, the reduction of intensity of C=O group associated with chain scission and breakage of carbonyl bond of modified graphene with P(S-co-MMA). This degradation of nanocomposites caused reduction in storage modulus and glass transition as confirmed below from the DMA, DSC and SEM analysis.

Raman Analysis

Figure 4A:
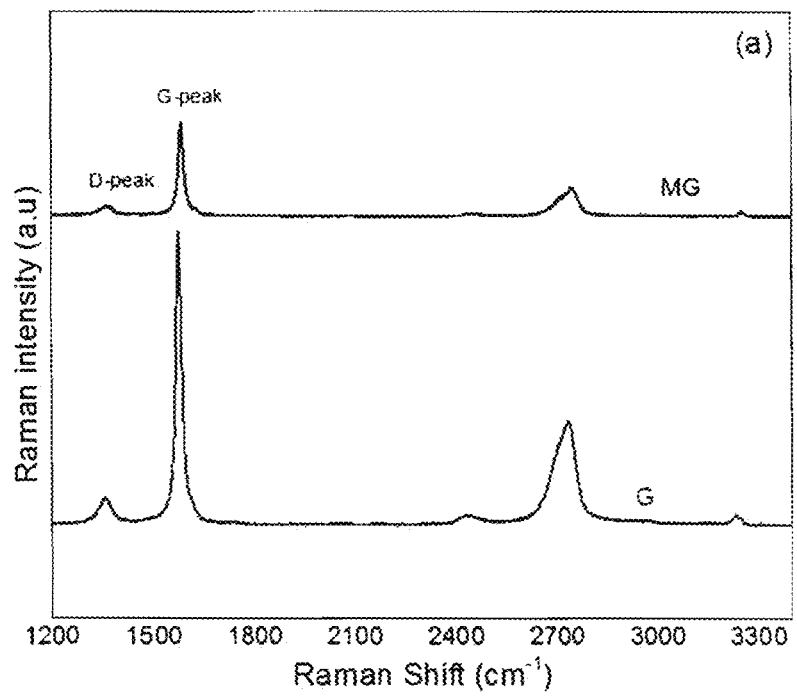
FIG. 4A is a graph showing Raman spectra of pristine and modified graphene.
Figure 4B:
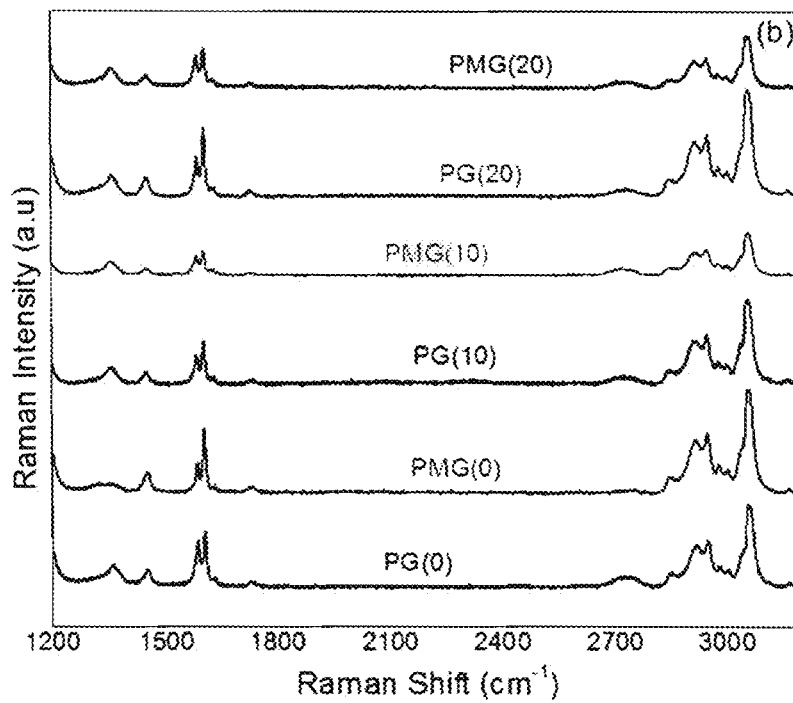
FIG. 4B is a graph showing Raman spectra of non-irradiated and irradiated PG and PMG.

FIGS. 4A and 4B show the assessment of Raman spectra of (A) pristine and modified graphene, and (B) non-irradiated and irradiated nanocomposites. The main features of Raman spectra are D-band, G-band, and 2D-band at peaks 1357 cm$^{-1}$, 1583 cm$^{-1}$, and 2700 cm$^{-1}$ respectively. The D band (disorder mode) is associated to the out-plane breathing mode of sp$^2$ atoms. D band is the revealing of the existence of the disorder in graphene and the best tool in evaluating the level of defects which appear in graphene. See C. Thomsen, S. Reich. Double resonant Raman scattering in graphite. Phys Rev Lett 2000; 85(24): 5214-5217; A. C Ferrari, J. Robertson. Resonant raman spectroscopy of disordered, amorphous, and diamond like carbon. Phys Rev 2001; B 64(7):075414, each incorporated herein by reference in their entirely. G-band corresponds to the E$_{2g}$, phonon at the center of the Brillouin zone or due to the sp$^2$ C=C stretching vibrations. See M. S Dresselhaus, Dresselhaus, G. Saito. *Physics of carbon nanotubes*. Carbon 1995; 33:925, incorporated herein by reference in its entirety. The presence of defects on graphene acted as potential active sites to form covalent bonds with P(S-co-MMA) polymer chains during microwave irradiation. The 2D-band was used to inspect the quality of graphene.

In Raman spectra of modified graphene (FIG. 4A), reduction in the intensity of G-peak and 2D-peak with respect to pristine graphene was observed. The reduction in intensity is from 1 to 20%, preferably from 2 to 15%, especially preferably from 5 to 10%. This indicates the breakage of sp$^2$ C=C bond of graphene which resulted in the formation of oxygen based functionalities on the surface of graphene. Increase in the ratio of intensity of D band to the intensity of G band (I$_D$:I$_G$) of modified graphene compared to pristine graphene is shown in Table 2, which clearly indicates the oxidation of graphene after modification. See S. R Rodney, S. Stankovich, A. D Dmitriy, D. P Richard, A. K Kevin, K. Alfred, J. Yuanyuan, W. Yue, T. N SonBinh. Synthesis of graphene-based nanosheets via chemical reduction of exfoliated graphite oxide. Carbon 2007; 45:1558-1565, incorporated herein by reference in its entirety.

In FIG. 4B, significant decrease in the intensity of G-peak and 2D-peak in non-irradiated PG and PMG was observed compared to pristine and modified graphene. The decrease in intensity ranges from 1 to 6%, preferably from 2 to 5%, especially preferably from 3 to 4%. This may be due to the breakage of pristine and modified graphene structure during the melt blending which leads to the attachment of P(S-co-MMA) chains on the pristine and modified graphene surface. In addition, the I$_D$:I$_G$ ratio (Table 2) which reveals the level of defects, is higher in value of non-irradiated PMG compared to non-irradiated PG nanocomposites. This is due to the better interaction and high grafting of P(S-co-MMA) chain on the surface of modified graphene compared to pristine graphene.

In Raman spectra of 10 minutes irradiated PG and PMG nanocomposites (FIG. 4B), the increase in intensity of the D band was observed. The increase in intensity ranges from 1 to 10%, preferably from 2 to 9%, especially preferably from 3 to 8%. This refers to the formation of defects in pristine and modified graphene induced by irradiation. The I$_D$:I$_G$ ratio of PG and PMG nanocomposites (Table 2) increased from 0.52 to 0.96 for PG and from 0.83 to 0.98 for PMG. This increase in the I$_D$:I$_G$ ratio is associated with formation of disorder in pristine and modified graphene and was explained by Ferrari and Robertson theory where the crystalline structure of graphene transform to nano crystalline graphene. This structural modification leads to the improvement in interaction and covalent bond formation between P(S-co-MMA) chains with pristine and modified graphene. Moreover the I$_D$:I$_G$ ratio, of non-irradiated and irradiated PMG was greater than the all PG nanocomposites (Table 2). This is attributed to the better interaction of modified graphene with P(S-co-MMA) chains than pristine graphene after melt blending and microwave irradiation.

The Raman spectra of 20 minutes irradiated PG and PMG nanocomposites (FIG. 4B) demonstrated further increase in the intensity of D-peak and G-peak. This refers to more defects formation on pristine and modified graphene. The I$_D$:I$_G$ ratio of 20 minutes irradiated of PG and PMG exhibited the decreasing behavior compared to 10 minutes irradiated PG and PMG nanocomposites, which reveals that at 20 minutes of irradiation, the pristine and modified graphene structure start to transform from a nano crystalline structure to an amorphous phase (enlightened by Ferrari and Robertson). The formation of amorphous structure of pristine and modified graphene at 20 minutes of irradiation results in weakening the interfacial interaction with P(S-co-MMA) chains and hence in reduction in mechanical and thermal properties of the nanocomposites. This is also in conformity with the results obtained from DMA and DSC analysis.

TABLE 2

$I_D:I_G$ ratio of pristine and modified graphene, and non-irradiated and irradiated PG and PMG nanocomposites.

| Samples | D peak(~1357) Intensity | G peak(~1583) Intensity | $I_D/I_G$ |
|---|---|---|---|
| Graphene | 92.1 | 863.1 | 0.11 |
| Modified graphene | 939.1 | 1177.1 | 0.79 |
| PG(0) | 158.7 | 300.1 | 0.52 |
| PMG(0) | 673.2 | 802.3 | 0.83 |
| PG(10) | 1413.1 | 1491.6 | 0.94 |
| PMG(10) | 2091.7 | 2130.9 | 0.98 |
| PG(20) | 2639.8 | 2776.8 | 0.95 |
| PMG(20) | 3332.5 | 3421.6 | 0.97 |

XRD Analysis

Figure 5A:
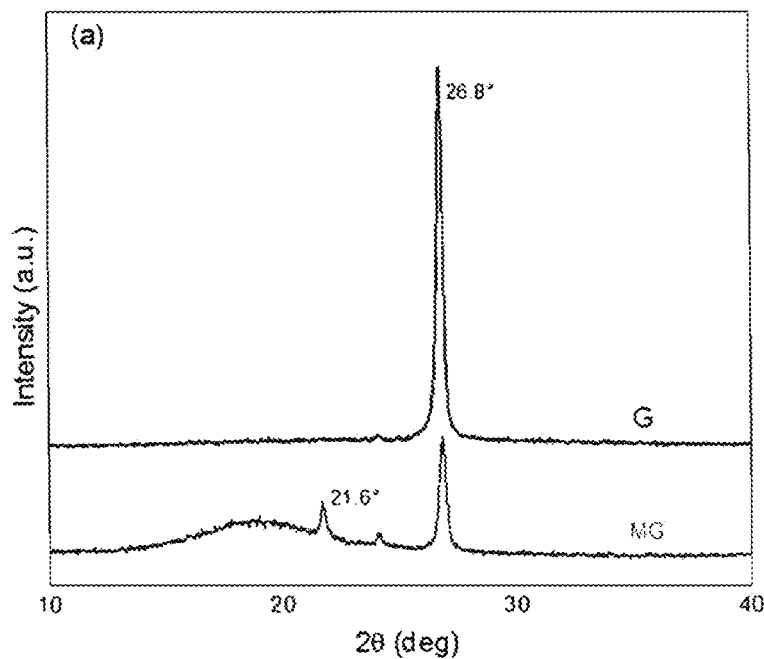
FIG. 5A is a graph showing X-ray diffraction of pristine and modified graphene.
Figure 5B:
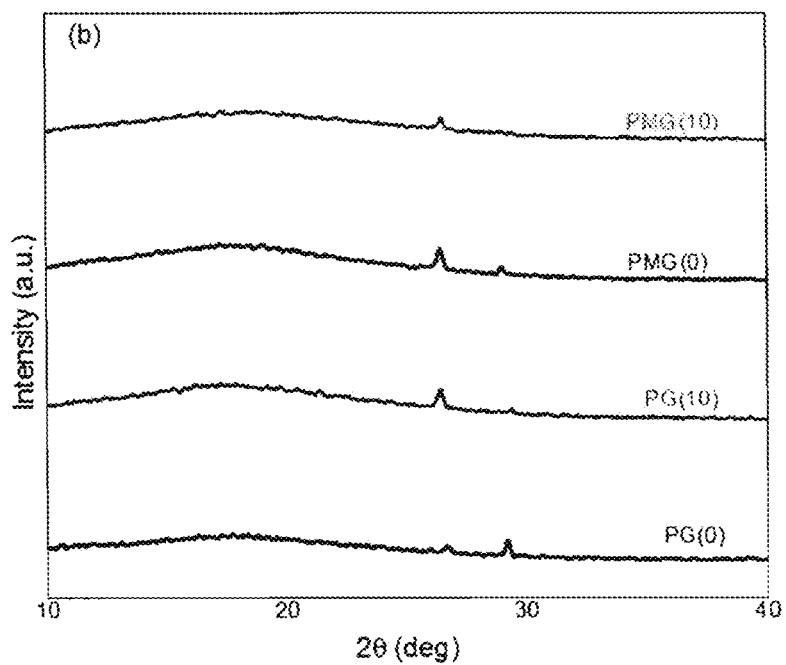
FIG. 5B is a graph showing X-ray diffraction of non-irradiated and irradiated PG and PMG.

The changes appeared in the crystal lattice of graphene after modification and dispersion of the nano filler in the polymer matrix were evaluated using XRD patterns. FIG. 5A displays that the diffraction peak of graphene was observed at 26.9° and modified graphene diffraction peak at 18.9°. The layer to layer spacing of modified graphene calculated using Bragg's equation was 0.47 nm which is slightly higher than pristine graphene (0.33 nm). This refers to the presence of oxygen functionalities and moisture content in modified graphene. See T. Szabo, O. Berkesi, I. Dekany. Study of deuterium-exchanged graphite oxide. Carbon 2005; 43: 3186-3189, incorporated herein by reference in its entirety. Reduction of diffraction peak intensity of graphene and modified graphene was observed in the XRD patterns of non-irradiated PG and PMG (FIG. 5A) respectively. This is attributed to the breakage of graphene and modified graphene structure which led to the exfoliation in the P(S-co-MMA) polymer matrix after melt blending. The presence of oxygen functionalities (polar groups) on the surface of modified graphene, confirmed by FTIR, enhanced the interaction with microwave irradiation and caused better interaction of modified graphene in P(S-co-MMA) matrix. This caused further reduction of diffraction peak of modified graphene in XRD patterns of 10 minutes irradiated-PMG (FIG. 5B).

DMA Analysis

The storage modulus of control P(S-co-MMA), non-irradiated and irradiated PG and PMG nanocomposites were evaluated using DMA (Table 3). After the addition of graphene or modified graphene in the P(S-co-MMA) polymer matrix via melt blending, the mechanical properties of both PG and PMG nanocomposites were enhanced compared to control P(S-co-MMA). For example, incorporation of 0.1 wt % graphene and modified graphene in PG and PMG resulted in an increase of storage modulus (at 40° C.) of about 26% and 38% respectively compared to control P(S-co-MMA).

Upon exposure to microwave radiation, significant improvement in storage modulus was achieved in both PG and PMG nanocomposites. At 10 minutes irradiation of the nanocomposites, the storage modulus (at 40° C.) increased from 1462 MPa to 1636 MPa for PG nanocomposite and from 1603 MPa to 2048 MPa for PMG nanocomposite. This is an increase of about 11.9% and 27.76% of storage modulus after 10 minutes of microwave irradiation (FIG. 4b) of PG and PMG nanocomposites, respectively. This enhancement in storage modulus results from the influence of three factors: (a) intrinsic mechanical property of graphene and modified graphene; (b) improvement in interaction of graphene and modified graphene in P(S-co-MMA) matrix due to structural changes by microwave irradiation which is also proven by Raman results; and (c) formation of covalent bonds between graphene or modified graphene with P(S-co-MMA) chains. The latter two factors (b and c) were observed more strongly in the case of modified graphene due to the presence of polar groups on its surface which improved the interaction of modified graphene after microwave radiation. Therefore it resulted in stronger and higher storage modulus composite compared to unmodified graphene polymer nanocomposite.

Figure 6A:
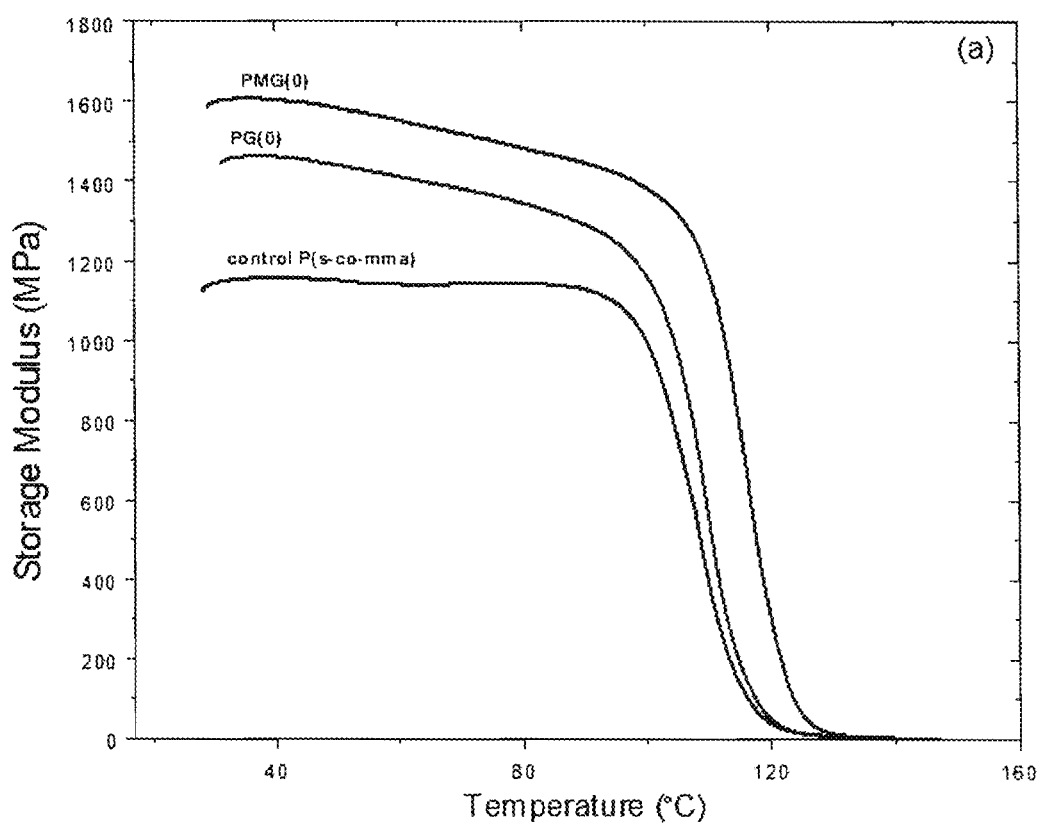
FIG. 6A is a graph showing storage modulus of control P(S-co-MMA), and non-irradiated PG and PMG.
Figure 6B:
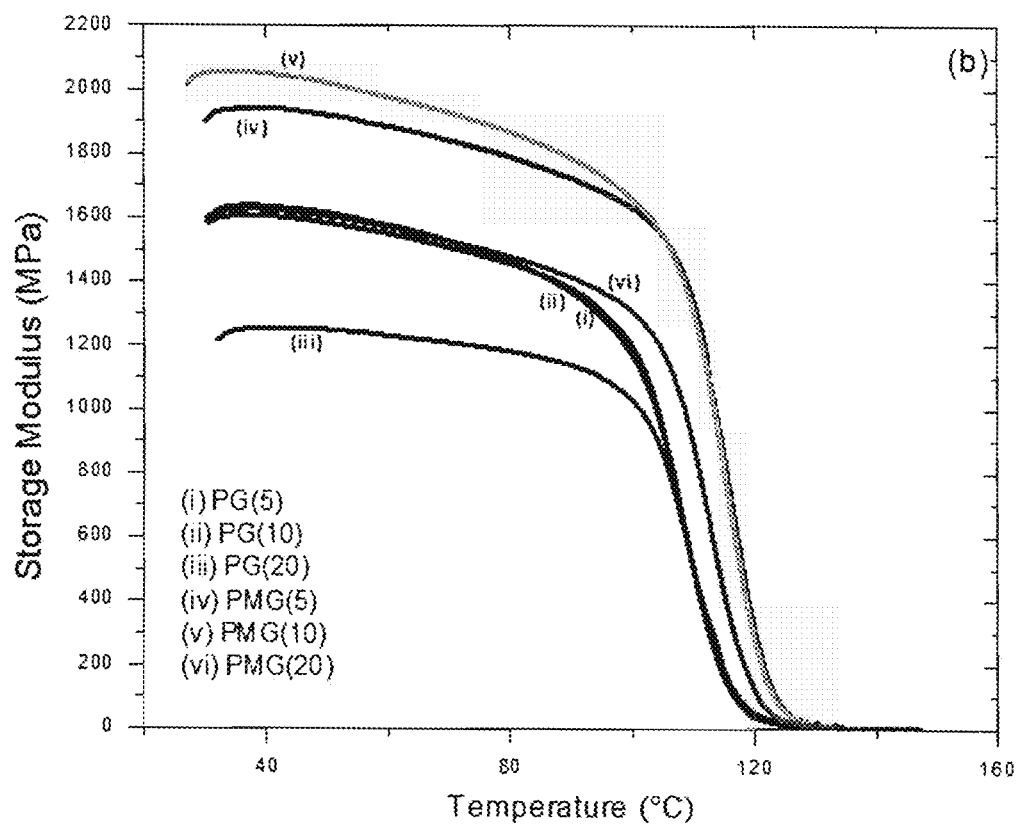
FIG. 6B is a graph showing storage modulus of irradiated PG and PMG nanocomposites.

The storage modulus of PG and PMG were reduced (by 23% and 20% with respect to 10 minutes irradiated samples) after a prolonged period of microwave irradiation (20 minutes) (FIG. 6B). This is attributed to the impact of two factors: (a) chain scission and photo degradation of the MMA in P(S-co-MMA), which leads the formation of oxygen based functionalities; and (b) transformation of crystalline phase of graphene and modified graphene into amorphous phase as evident from Raman results. These two factors resulted in lower interfacial adhesion of graphene or modified graphene with the copolymer matrix and thus produced weak polymer graphene nanocomposites.

TABLE 3

Storage modulus of PG and PMG nanocomposites before and after microwave irradiation.

| Sample Name | MPa (40° C.) | MPa (100° C.) |
|---|---|---|
| control P(S-co-MMA) | 1160 | 996 |
| PG(0) | 1462 | 1165 |
| PMG(0) | 1603 | 1382 |
| PG(5) | 1604 | 1198 |
| PG(10) | 1636 | 1169 |
| PG(20) | 1254 | 1025 |
| PMG(5) | 1941 | 1631 |
| PMG(10) | 2048 | 1660 |
| PMG(20) | 1628 | 1305 |

DSC Analysis

Figure 7A:
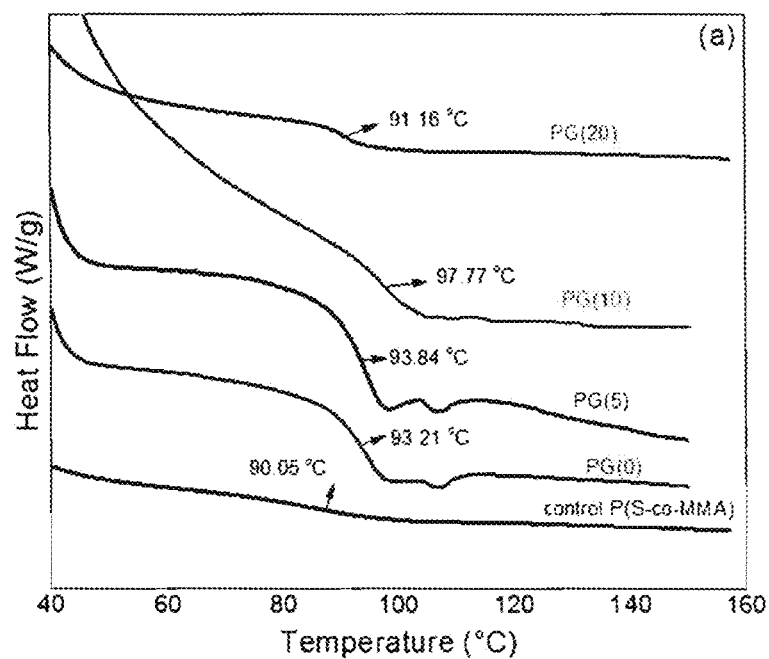
FIG. 7A is a graph showing glass transition temperature observed from DSC for control P(S-co-MMA), and non-irradiated and irradiated PG.
Figure 7B:
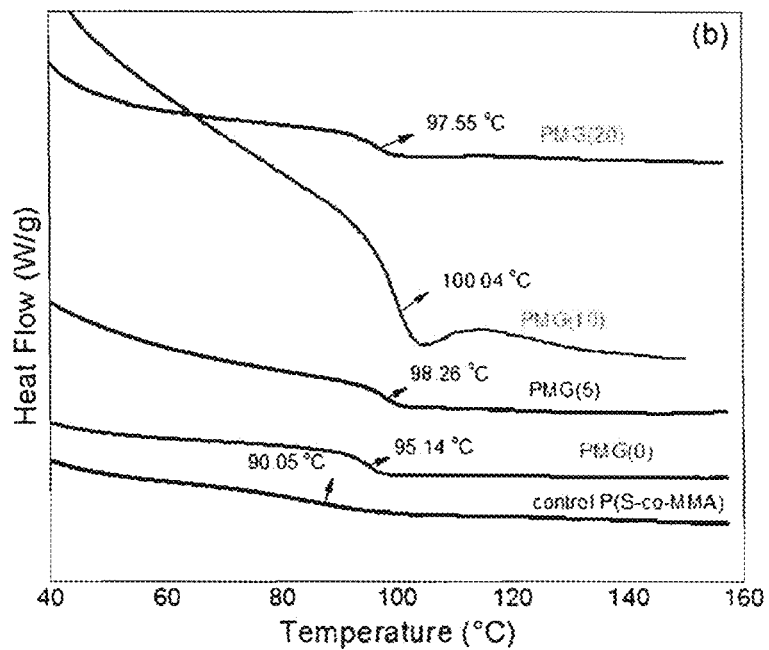
FIG. 7B is a graph showing glass transition temperature of non-irradiated and irradiated PMG.

Glass transition temperature is a macroscopic property which is the measure of relaxation behavior of polymer and polymer nanocomposites. The $T_g$ of graphene based polymer composites, especially non-polar polymer were not significantly tailored compared to the polar polymers. FIGS. 7A and 7B illustrates that there is an increase of 3.2° C. and 5.1° C. in $T_g$ of the nanocomposites containing 0.1 wt % of G and MG, respectively. The higher value of $T_g$ of PMG compared to PG nanocomposites indicates that modified graphene has better interaction with P(S-co-MMA) matrix due to the presence of oxygen functional groups on the surface of modified graphene. An improvement in the $T_g$ of both PG and PMG was observed on exposure to microwave irradiation up to 10 minutes (i.e. increase from 93.21° C. to 97.77° C. (FIG. 7A) and from 95.14° C. to 100.04° C. (FIG. 7B) of PG and PMG, respectively. This indicates a better interaction and covalent bonding between graphene or modified graphene with P(S-co-MMA) matrix. Degradation of PG and PMG nanocomposites were produced due to the breakage of polymer chains that created weak interaction between graphene and P(S-co-MMA) matrix. The degradation of polymer nanocomposites resulted in reduction of $T_g$ value as observed at 20 minutes of irradiation of PG and PGM nanocomposites (FIG. 7B).

SEM Analysis

The surface morphology of the irradiated and non-irradiated PG and PMG nanocomposites were evaluated by scanning electron microscopy (SEM). The SEM image of non-irradiated PG in FIG. 8B shows the fractured rough surface with discrete patterns compared to control P(S-co-MMA) (FIG. 8A). This reveals the reinforcement effect of graphene in the polymer matrix. In contrast, the good interfacial interaction between modified graphene and polymer matrix resulted in a much smoother and continuous surface morphology of PMG nanocomposite (FIG. 8E) with respect to control P(S-co-MMA) and non-irradiated PG nanocomposite. This attributes to the higher mechanical and thermal properties of PMG nanocomposite compared to PG nanocomposite. The rough surface of PG nanocomposite (FIG. 8B) also revealed the low interfacial interaction between graphene and polymer matrix.

The interaction between graphene and polymer matrix was improved on exposure to microwave irradiation for 10 minutes (FIG. 8C). This changed the rough and discrete surface into a smooth and continuous surface that resembles the non-irradiated PGM nanocomposite (FIG. 8E). In FIG. 8F, the fibrous like cross-linked network structure appeared on the PGM nanocomposite after 10 minutes of irradiation. This fibrous structure strengthened the PGM nanocomposite and thereby increased storage modulus and glass transition as illustrated in Table 3.

In FIGS. 8D and 8G, breakage of polymer chains caused the formation of voids on the surface of PG and PGM nanocomposites after 20 minutes of irradiation. The degradation of polymer chains at high microwave treatment made the nanocomposites weak and reduced the storage modulus as explained from the DMA results. In addition, FIG. 8G showed that some fibrous and cross-linked structure still remained in degraded PMG nanocomposite. This restrained the strength and resulted in higher mechanical and thermal property compared to the control P(S-co-MMA).

The present disclosure provides a method to enhance the interaction between graphene and P(S-co-MMA) copolymer matrix. Modification of graphene was carried out using nitric acid. The nanocomposites of P(S-co-MMA) copolymer with pristine or modified graphene were prepared via melt blending. The polymer nanocomposites were exposed to microwave radiation at different time durations to analyze its effect on the mechanical and thermal properties. The mechanism of improved interaction and grafting of graphene or modified graphene on P(S-co-MMA) polymer chains during melt blending and microwave irradiation was explained by Raman spectra. Modified graphene developed a better interfacial interaction with polymer matrix melt blending and microwave irradiation compared to pristine graphene. This resulted in higher mechanical properties and better thermal stability of the nanocomposites. The formation of defects on modified graphene and free radicals on P(S-co-MMA) polymer chains after irradiation as explained by Raman spectroscopy and XRD studies. The nanocomposites with 0.1 wt % G and MG have shown a 26% and 38% increase in storage modulus. Microwave irradiation up to 10 minutes of PMG nanocomposite resulted in 27.6% increase of storage modulus which is greater than that of 10 minutes irradiated PG nanocomposite storage modulus (11.9% increase). The better improvement of properties of PMG after melt blending and microwave irradiation (10 minutes) is due to the presence of oxygen based functionalities on the surface of modified graphene (confirmed by FTIR). The glass transition temperature of nanocomposites also improved considerable after melt blending and microwave irradiation (but only for polymer modified graphene nanocomposite). Conversely at longer irradiation period (20 minutes), the chain scission and photo degradation of the host P(S-co-MMA) polymer chains led to the reduction in mechanical and thermal properties of the nanocomposites. The degraded polymer nanocomposites were confirmed by the presence of cracks and holes with coarse rough surface using SEM study.

The invention claimed is:

1. A blend composition, comprising graphene nanoparticles and a poly(styrene-co-methylmethacrylate),
    wherein a content ratio (weight/weight) of polystyrene to methyl methacrylate in the poly(styrene-co-methylmethacrylate) is from 50-90/20-40,
    wherein the graphene nanoparticles are dispersed in the poly(styrene-co-methylmethacrylate),
    and the graphene nanoparticles are surface modified with oxygen functionalities.

2. The blend composition of claim 1, wherein the blend composition has an intensity level of the D band at 1357 $cm^{-1}$ ranging from 2000 to 2200 and an intensity level of the G band at 1583 $cm^{-1}$ of from 2050 to 2200.

3. The blend composition of claim 1, wherein the storage modulus of the blend composition is from 1800 to 2200 MPa at 100° C. and from 1400 to 1800 MPa at 40° C.

4. The blend composition of claim 1, wherein the glass transition temperature of the blend composition is from 92.0 to 106.0° C.

5. The blend composition of claim 1, wherein the blend composition has a crystal lattice structure with layer to layer spacing of the modified graphene nanoparticles in the range of from 0.35 to 0.55 nm.

6. The blend composition of claim 1, wherein the oxygen functionalities are selected from the group consisting of a carboxyl group, a carbonyl group, an epoxy group, and a hydroxyl group, on a defect site or a side wall of graphene.

7. The blend composition of claim 1, wherein a content of the graphene nanoparticles is from 0.05 to 0.125 wt % based on 100 wt % of the poly(styrene-co-methylmethacrylate).

8. The blend composition of claim 1, wherein the poly(styrene-co-methylmethacrylate) and the graphene nanoparticles are bonded through a methacrylate portion of the poly(styrene-co-methylmethacrylate) to the graphene by addition across a C=C bond.

9. A blend composition, comprising graphene nanoparticles and a poly(styrene-co-methylmethacrylate),
    wherein the graphene nanoparticles are dispersed in the poly(styrene-co-methylmethacrylate),
    and the graphene nanoparticles are surface modified with oxygen functionalities, and
    wherein a storage modulus of the blend composition is from 1800 to 2200 MPa at 100° C. and from 1400 to 1800 MPa at 40° C.

10. A blend composition, comprising graphene nanoparticles and a poly(styrene-co-methylmethacrylate),
    wherein the graphene nanoparticles are dispersed in the poly(styrene-co-methylmethacrylate),
    and the graphene nanoparticles are surface modified with oxygen functionalities, and
    wherein a glass transition temperature of the blend composition is from 92.0 to 106.0° C.

11. A blend composition, comprising graphene nanoparticles and a poly(styrene-co-methylmethacrylate),
    wherein the graphene nanoparticles are dispersed in the poly(styrene-co-methylmethacrylate),
    and the graphene nanoparticles are surface modified on a defect site or a side wall of graphene with oxygen functionalities selected from the group consisting of a carboxyl group, a carbonyl group, an epoxy group, and a hydroxyl group.

* * * * *